No. 793,192. PATENTED JUNE 27, 1905.
E. Y. HARRISON.
ROCKING HORSE.
APPLICATION FILED JULY 23, 1902.

Witnesses:
L. G. Snow.
Hartwell Benjamin.

Inventor:
Edward Youngman Harrison
By Fredk. Benjamin
Atty.

No. 793,192.    Patented June 27, 1905.

UNITED STATES PATENT OFFICE.

EDWARD YOUNGMAN HARRISON, OF BALLINA, NEW SOUTH WALES, AUSTRALIA, ASSIGNOR OF ONE-HALF TO THOMAS TEMPERLEY, OF BALLINA, NEW SOUTH WALES, AUSTRALIA.

ROCKING-HORSE.

SPECIFICATION forming part of Letters Patent No. 793,192, dated June 27, 1905.

Application filed July 23, 1902. Serial No. 116,753.

*To all whom it may concern:*

Be it known that I, EDWARD YOUNGMAN HARRISON, a subject of the King of Great Britain, residing at Ballina, in the State of New South Wales, Commonwealth of Australia, have invented new and useful Improvements in Rocking-Horses, of which the following is a specification.

This invention relates to that class of devices for amusement in which the user is supported and carried on a body made in simulation of a horse or other animal to which motion is imparted by the rocking movements of the body of the user. The particular objects of my improvements are to provide a device of this character in which the rocking movement may be utilized to drive forward or forward and backward on longitudinal planes the rocking body, thus effecting a compound movement calculated to add to the pleasure of the user.

While I have shown my invention as applied to a body made in the form of a horse and mounted on a track having terminals, it will be apparent that the mechanism may be equally as well adapted to any animal form or to a coach or other device capable of having a rocking movement imparted thereto, and that the track may be in the form of a ring, such modifications being clearly within the scope of my invention.

Figure 1:
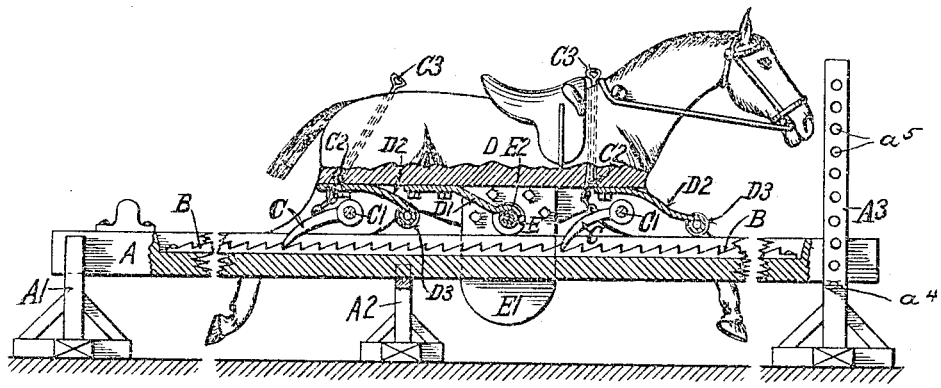
Figure 2:
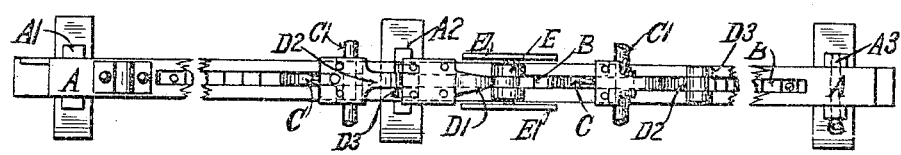
Figure 3:
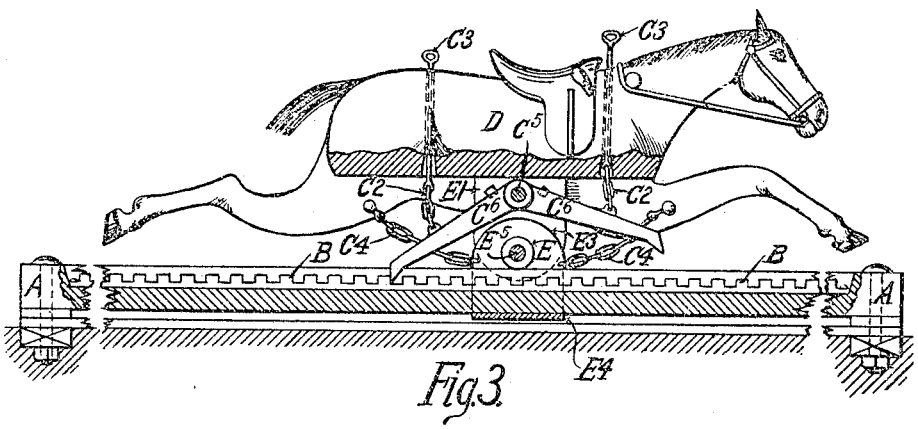

In the accompanying drawings, which form a part of this application, Figure 1 is a view, partly in side elevation and partly in section, of my invention complete. Fig. 2 is a top plan view of the same with the horse removed; and Fig. 3 is a view, partly in side elevation and partly in section, showing a modification of the device disclosed in Fig. 1.

Referring to the drawings in detail, A represents a longitudinally-recessed bar, which is suitably supported by uprights $A'$, $A^2$, and $A^3$. The forward end of the bar may be vertically adjusted by changing the peg or pin $a^4$, upon which it rests, from one to another of the series of holes $a^5$, formed in the bar $A^3$, thus giving any desired incline to the bar. Secured to the upper side of the recessed portion of the bar is a toothed rack B, the teeth of which, as shown in Fig. 1, are inclined or pitched forward in the direction in which the horse is to be moved by the rocking movement aforesaid.

C C represent pawls, which are pivoted on pins $C'$, secured in the upper part of the legs of the horse directly over the rack, so that the free ends of the pawls normally engage the teeth of the rack.

The horse-body D is of the usual form in such devices and is supported on the bar by spring-arms $D'$ and $D^2$, by the rollers E and $D^3$, and by guide-plates $E'$. The spring-arm $D'$ is secured at one end to the under side of the body near the center and projects forwardly and downwardly and has its free end bearing downwardly on the spindle $E^2$ of the roller E, thus holding the latter in engagement with the upper edge of the bar on each side of the rack. The spring-arms $D^2$ are secured at the front and rear ends, respectively, of the horse, project forward and downward, and embrace the spindles of the rollers $D^3$, which are so positioned that they alternately engage the upper edge of the bar as the horse is rocked. The plates $E'$ are bolted to the central portion of the body of the horse and extend downwardly, so as to embrace the sides of the bar, thus preventing the horse from being tipped over sidewise. The ends of the spindle $E^2$ bear against the inner sides of the plates $E'$.

Normally the free ends of the pawls are in constant engagement with the teeth of the rack; but they may be disengaged by means of the chains $C^2$, the lower ends of which are secured to eyes on the back of the pawls, the chains then passing upward through suitable openings in the body of the horse and terminate in handles $C^3$.

In the modified form of my invention shown in Fig. 3 the teeth of the rack have vertical sides, thus adapting them to receive the thrust of engaging pawls in either direction. The pawls $C^6$ are mounted on a pivot-pin $C^5$, which is common to both and is secured in the plates E' at a point just below the center of the horse's body. The engaging ends of the pawls are so formed or pitched that one will advance the body of the horse when the latter is rocked and the other will cause the body to travel backward. In practice only one pawl is permitted to engage the rack at a time or until the forward or backward limit of movement is reached. In this construction I prefer to have the guide-plates E' overlap and embrace a U-shape plate $E^4$, which embraces the side and bottom of the bar and is secured to the plates E' by the spindle $E^5$ of the roller E, the latter bearing on the upper edge of the bar. To limit the rocking of the body, I secure to the front and rear legs, respectively, chains $C^4$, the other ends of which are made fast in the U-shaped plate $E^4$. As shown in Fig. 3, the front pawl $C^6$ being disengaged, the horse will move forward on the rack upon being rocked, and when it has reached the limit of its forward movement the positions of the pawls will be reversed, whereupon the horse will move backward under the rocking motion.

Having thus described my invention, what I claim as new, and desire to obtain by Letters Patent, is—

1. In devices of the character described, a supporting-bar having a rack secured thereto, a body centrally pivoted on said bar, pawls pivoted on said body and having their ends normally engaging said rack, and means for disengaging the pawls from the rack, substantially as set forth.

2. In devices of the character stated, a supporting-bar having a rack secured thereto, a body pivoted on said bar, pawls pivoted on said body, extending in opposite directions and having their free ends adapted to engage said rack, and means for disengaging the pawls from the rack.

3. In devices of the character set forth, a supporting-bar having a rack secured thereto, a body yieldingly pivoted on said bar, pawls pivoted on said body and having their free ends normally engaging said rack, and means for disengaging the pawls from the rack.

4. In devices of the character mentioned, a supporting-bar having a rack secured thereto, a centrally-pivoted body having a spring-supported roller resting on said bar, pawls pivoted on said body and having their free ends engaging said rack, and means for disengaging the pawls from the rack.

5. In rocking-horses and the like, a supporting rack-bar, a centrally pivoted body having a spring-supported roller resting on said bar, and means whereby the rocking motion of the body will cause it to move longitudinally along said rack-bar.

6. In devices of the character described, the combination of a centrally-pivoted body, a supporting-bar for said body, a rack secured to said bar and having inclined teeth, pawls pivoted on said body and adapted to engage one side of said teeth, means for raising said pawls out of engagement with the teeth, spring-arms secured to said body, and rollers mounted in the outer ends of said arms, substantially as set forth.

In testimony whereof I have signed my name to this specification in the presence of two subscribing witnesses.

EDWARD YOUNGMAN HARRISON.

Witnesses:
T. G. ADRIAN,
THOS. CONDRAN.